(12) United States Patent
Teyeb et al.

(10) Patent No.: US 12,418,839 B2
(45) Date of Patent: Sep. 16, 2025

(54) METHOD FOR INTER-RADIO ACCESS TECHNOLOGY HANDOVER

(71) Applicant: TELEFONAKTIEBOLAGET LM ERICSSON (PUBL), Stockholm (SE)

(72) Inventors: Oumer Teyeb, Solna (SE); Lian Araujo, Solna (SE); Patrik Rugeland, Stockholm (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 776 days.

(21) Appl. No.: 16/970,622

(22) PCT Filed: Feb. 15, 2019

(86) PCT No.: PCT/IB2019/051259
§ 371 (c)(1),
(2) Date: Aug. 17, 2020

(87) PCT Pub. No.: WO2019/159136
PCT Pub. Date: Aug. 22, 2019

(65) Prior Publication Data
US 2021/0337436 A1   Oct. 28, 2021

Related U.S. Application Data

(60) Provisional application No. 62/631,421, filed on Feb. 15, 2018.

(51) Int. Cl.
*H04W 36/00* (2009.01)
*H04W 12/04* (2021.01)
*H04W 36/14* (2009.01)

(52) U.S. Cl.
CPC . *H04W 36/0038* (2013.01); *H04W 36/00222* (2023.05); *H04W 12/04* (2013.01); *H04W 36/00698* (2023.05); *H04W 36/1443* (2023.05)

(58) Field of Classification Search
CPC ......... H04W 36/0038; H04W 36/0022; H04W 36/14; H04W 12/04; H04W 36/0069; H04W 36/0066
See application file for complete search history.

(56) References Cited

U.S. PATENT DOCUMENTS

| 10,154,535 B2 | 12/2018 | Xu et al. |
| 2011/0194533 A1 | 8/2011 | Chen |

(Continued)

FOREIGN PATENT DOCUMENTS

| CN | 106028409 B | 1/2020 |
| JP | 2010104020 A | 5/2010 |

(Continued)

OTHER PUBLICATIONS

Ericsson, Inter-system and inter-RAT mobility for LTE Connected to 5GC, Tdoc R2-1713271, 3GPP TSG-RAN WG2 #100, Reno, Nevada, USA, Nov. 27-Dec. 1, 2017.

(Continued)

*Primary Examiner* — Mazda Sabouri
(74) *Attorney, Agent, or Firm* — Ericsson Inc.

(57) ABSTRACT

A method for inter-Radio Access Technology (RAT) handover comprises preparing, at a target node, a reconfiguration message based on that the target node is inter-RAT and intra-system to a source node, and sending, to the source node, the reconfiguration message for forwarding the reconfiguration message to a user equipment (UE). The reconfiguration message comprises configuration for reconfiguring lower layer at the UE and further keeps the UE from reconfiguring upper-layer configuration. The target node disclosed in the method prepares a reconfiguration message specific to different types of RAT combination and system (Continued)

between the source node and the target node to provide loss-less and in-order data delivery during and after the handover.

28 Claims, 19 Drawing Sheets

(56) References Cited

U.S. PATENT DOCUMENTS

| | | | |
|---|---|---|---|
| 2013/0107863 A1 | 5/2013 | Faccin | |
| 2018/0115929 A1 | 4/2018 | Wu | |
| 2019/0306767 A1* | 10/2019 | Martin | H04W 36/04 |
| 2020/0322850 A1* | 10/2020 | Zhu | H04W 76/25 |

FOREIGN PATENT DOCUMENTS

| | | |
|---|---|---|
| KR | 20180013862 A | 2/2018 |
| WO | 2016195735 A1 | 12/2016 |

OTHER PUBLICATIONS

3rd Generation Partnership Project; Technical Specification Group Radio Access Network; Study on New Radio Access Technology; Radio Interface Protocol Aspects (Release 14) 3GPP TR 38.804 V14.0.0, Mar. 2017.
Ericsson, NR RRCConnectionReconfiguration procedure and signalling baseline, Tdoc R2-1707201, 3GPP TSG-RAN WG2 #NR2, Qingdao, P.R. of China, Jun. 27-29, 2017.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) 3GPP TS 36.300 V15.0.0, Dec. 2017.
3rd Generation Partnership Project; Technical Specification Group Radio Access Network; Evolved Universal Terrestrial Radio Access (E-UTRA); Radio Resource Control (RRC); Protocol specification (Release 15) 3GPP TS 36.331 V15.0.0, Dec. 2017.
3rd Generation Partnership Project; Technical Specification Group Radio Access Network; NR Radio Resource Control (RRC) protocol specification (Release 15) 3GPP TS 38.331 V15.0.0, Dec. 2017.
3rd Generation Partnership Project; Technical Specification Group Radio Access Network; Evolved Universal Terrestrial Radio Access (E-UTRA) and NR; Multi-connectivity; Stage 2 (Release 15) 3GPP TS 37.340 V1.1.0, Oct. 2017.
Brd Generation Partnership Project; Technical Specification Group Radio Access Network; NR; NR and NG-RAN Overall Description; Stage 2 (Release 15); 3GPP TS 38.300 V1.0.0, Sep. 2017.
Ericsson, RRC procedures for inter-RAT mobility from NR to E-UTRA, R2-1802643, 3GPP TSG-RAN WG2 #101, Athens, Greece, Feb. 26-Mar. 2, 2018.
Ericsson, TP to 36.331 for inter-RAT mobility between NR and E-UTRA, R2-1804796, 3GPP TSG-RAN WG2 #101bis, Sanya, P.R. of China, May 16-20, 2018.
3GPP TS 36.300 V14.5.0, 3rd Generation Partnership Project,Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.331 V15.0.1 (Jan. 2018) 3rd Generation Partnership Project; Technical Specification Group Radio Access Network;Evolved Universal Terrestrial Radio Access (E-UTRA); Radio Resource Control (RRC); Protocol specification (Release 15).
3GPP TS 37.340 V15.1.0 (Mar. 2018)Technical Specification Group Radio Access Network; Evolved Universal Terrestrial Radio Access (E-UTRA) and NR; Multi-connectivity; Stage 2.
Ericsson, "Lossless intra-system handover with 5G-CN", 3GPP TSG RAN WG2 #98-AH, R2-1707231 (revision of R2-1705431), Jun. 27-29, 2017, www.3gpp.org/ftp/tsg_ran/WG2_RL2/TSGR2_AHs/2017_06_NR/Docs/R2-1707231.zip.
Ericsson, "NR RRC procedure for inter-RAT handover", 3GPP TSG RAN WG2 NR AH1801, R2-1801016 (revision of R2-1713397), Jan. 22-26, 2018, www.3gpp.org/ftp/tsg_ran/WG2_RL2/TSGR2_AHs/ 2018_01_NR/Docs/R2-1801016.zip.
Intel, "Basic handover procedure in NR", 3GPP TSG-RAN WG2 #AdHoc Meeting, R2-1707012, Qingdao, China, Jun. 27-29, 2017, 7 pages.
3GPP TS 38.300 v1.1.0 (Oct. 2017) Technical Specification Group Radio Access Network; NR; NR and NG-RAN Overall Description; Stage 2 (Release 15).
3rd Generation Partnership Project; Technical Specification Group Radio Access Network; Evolved Universal Terrestrial Radio Access IE-UTRA); Radio Resource Control (RRC); Protocol Specification (Release 15) 3GPP TS 36.331 V15.0.1, Jan. 9, 2018.
Ericsson: "TP to 36.331 for inter-RAT mobility between NR and E-UTRA". 3GPP TSG-RAN WG2 #101bis. R2-1804796. Sanya, P.R. of China, 16th-20th 2018.

* cited by examiner

METHOD FOR INTER-RADIO ACCESS TECHNOLOGY HANDOVER

TECHNICAL FIELD

Particular embodiments relate to the field of handover in telecommunications; and more specifically, to methods, apparatus and systems for an inter-radio access technology (RAT), intra-system handover.

BACKGROUND

In a handover between the network nodes adopting different radio access technologies (RATs), the inter-RAT handover from LTE connected to Evolved Packet Core (LTE/EPC) basically implies a full configuration of the UE, where none of LTE-established protocol sublayers and previously used security keys are kept.

FIG. 1 illustrates a mobility from E-UTRA, when a tunneling procedure is successfully adopted, where the source eNB sends a MobilityFromEUTRACommand to the UE containing an embedded message pertinent to the target RAT.

MobilityFromEUTRACommand message is defined in TS 36.331 (v15.0.1 [2018-01]). TargetRAT-type and targetRAT-MessageContainer are the main contents in MobilityFromEUTRACommand message related to UE configuration in the target RAT. The former defines the RAT, e.g. UTRA, GERAN, and the latter contains the configuration message itself from the target RAT. The nas-SecurityParamFromEUTRA is used for security key derivation in UTRAN.

The content of the MobilityFromEUTRACommand message is specified in Table 1 below.

TABLE 1

| MobilityFromEUTRACommand message |
|---|
| -- ASN1START |
| ------------- |
| Omitted Parts |
| ------------- |
| Handover ::=  SEQUENCE { |
|    targetRAT-Type  ENUMERATED { utra, geran, cdma2000-1XRTT, cdma2000-HRPD, spare4, spare3, spare2, spare1, ...}, |
|    targetRAT-MessageContainer  OCTET STRING, |
|    nas-SecurityParamFromEUTRA  OCTET STRING (SIZE (1))  OPTIONAL, -- Cond UTRAGERAN |
|    systemInformation  SI-OrPSI-GERAN  OPTIONAL -- Cond PSHO |
| } |
| ------------- |
| Omitted Parts |
| ------------- |
| -- ASN1STOP |

Similarly, FIG. 2 illustrates that inter-RAT handover to LTE/EPC is performed in a tunneling scheme with the RRCConnectionReconfiguration message delivered to the UE via the source RAT. This Radio Resource Control (RRC) message indicates a full configuration and does not retain any protocol sublayers established by the source RAT and previous derived security keys.

For security handling in legacy procedure, when a UE performs a handover from UTRAN or GERAN to LTE/EPC, the RRCConnectionReconfiguration message defined in TS 36.331 (v15.0.1 [2018-01]) includes a parameter nas-SecurityParamToEUTRA consisting of a 5 octet $NONCE_{MME}$ used to derive new $K_{eNB}$ keys as defined in [TS 33.401]. This parameter is contained in SecurityConfigHO IE, defined for inter-RAT case.

The content of the RRCConnectionReconfiguration message is specified Table 2 below.

TABLE 2

| RRCConnectionReconfiguration message |
|---|
| -- ASN1START |
| ------------- |
| Omitted Parts |
| ------------- |
| SecurityConfigHO ::=  SEQUENCE { |
|    handoverType  CHOICE { |
|      intraLTE  SEQUENCE { |
|        securityAlgorithmConfig  SecurityAlgorithmConfig  OPTIONAL, -- Cond fullConfig |

TABLE 2-continued

| RRCConnectionReconfiguration message | |
|---|---|
| keyChangeIndicator | BOOLEAN, |
| nextHopChainingCount | NextHopChainingCount |
| }, | |
| interRAT | SEQUENCE { |
| securityAlgorithmConfig | SecurityAlgorithmConfig, |
| nas-SecurityParamToEUTRA | OCTET STRING (SIZE(6)) |
| } | |
| }, | |
| } | |
| ... | |
| } | |
| Omitted Parts | |
| -- ASN1STOP | |

FIG. 3 illustrates an example architecture for LTE connected to 5G Core Network (5GC) and EPC, and New Radio (NR) regarding connection to core network (CN). The motivation for the usage of new security keys described above is the inference that inter-RAT handover also stands for a CN system change, i.e., inter-system handover. For LTE/5GC, however, an inter-RAT handover will not always imply in an inter-system handover.

For instance, it is expected that handover could be performed between LTE and NR, while both RATs are connected to 5GC. Another possible scenario is LTE intra-RAT handover with CN system change between EPC and 5GC. Besides LTE, inter-RAT handover in NR can also be split between inter-system and intra-system handover, where a handover between LTE and NR is expected to address LTE connected to 5GC or EPC.

FIG. 4 illustrates a control plane architecture for E-UTRA NR dual connectivity (EN-DC). FIG. 5 illustrates a radio protocol architecture for master cell group (MCG), secondary cell group (SCG) and split bearers from a UE perspective in Multi-RAT Dual Connectivity (MR-DC) with EPC. FIG. 6 illustrates a network side protocol termination for MCG, SCG and split bearers in MR-DC with EPC.

In LTE release 15, the concept of EN-DC was introduced, where a LTE eNB could act as a master node and add a NR gNB as a secondary node. The control plane (CP) was always connected to EPC, but the user plane (UP) could either be connected to EPC or 5GC, where bearers could operate either NR Packet Data Convergence Protocol (PDCP) or LTE PDCP with either NR or LTE lower layers [TR 37.340 v15.0.0 (2017-12)].

To configure the NR parts of the bearers which are either for the full stack, only the Service Data Adaptation Protocol (SDAP)/PDCP, or only Radio Link Control/Medium Access Control/Physical Layer (RLC/MAC/PHY), the UE receives the RRC message, RRCConnectionReconfiguration message which was extended with an nr-Config-r15 structure, as described in TR 36.331 (v15.0.1 (2018-01) shown in Table 3 below.

TABLE 3

| RRCConnectionReconfiguration message with the nr-Config-r15 structure | | | |
|---|---|---|---|
| -- ASN1START | | | |
| Omitted Parts | | | |
| RRCConnectionReconfiguration-v15x0-IEs ::= SEQUENCE { | | | |
| nr-Config-r15 | CHOICE { | | |
| release | NULL, | | |
| setup | SEQUENCE { | | |
| endc-ReleaseAndAdd-r15 | BOOLEAN, | | |
| nr-SecondaryCellGroupConfig-r15 | | OCTET STRING | OPTIONAL, -- Need ON |
| p-MaxEUTRA-r15 | | P-Max | OPTIONAL --Need ON |
| } | | | |
| } | | | OPTIONAL, -- Need ON |
| sk-Counter-r15 | INTEGER (0.. 65535) | | OPTIONAL, -- Need ON |
| nr-RadioBearerConfig1-r15 | OCTET STRING | | OPTIONAL, -- Need ON |
| nr-RadioBearerConfig2-r15 | OCTET STRING | | OPTIONAL, -- Need ON |
| tdm-PatternSingleTx-r15 | CHOICE { | | |
| release | NULL, | | |
| setup | SEQUENCE { | | |
| subframeAssignment-r15 | SubframeAssignment-r15, | | |
| harq-Offset-r15 | INTEGER (0.. 9) | | |
| } | | | |
| } | | | OPTIONAL, -- Need ON |
| nonCriticalExtension   SEQUENCE { } | | | OPTIONAL |
| } | | | |
| Omitted Parts | | | |
| -- ASN1STOP | | | |

The NR bearers are configured using the structures nrBearerConfig½ and contain configurations defined in TR 38.331 (v15.0.0 [2017-12]). The content of the RadioBearerConfig information element is specified Table 4 below.

TABLE 4

RadioBearerConfig information element

```
-- ASN1START
-- TAG-RADIO-BEARER-CONFIG-START
RadioBearerConfig ::=            SEQUENCE {
    srb-ToAddModList             SRB-ToAddModList
        OPTIONAL,       -- Need M
    srb-ToReleaseList            INTEGER (3)
        OPTIONAL,       -- Need M
    drb-ToAddModList             DRB-ToAddModList
        OPTIONAL,       -- Need M
    drb-ToReleaseList            DRB-ToReleaseList
        OPTIONAL,       -- Need M
    securityConfig               SecurityConfig
        OPTIONAL        -- Cond KeyChange
}
SRB-ToAddModList ::=             SEQUENCE (SIZE (1..2)) OF SRB-ToAddMod
SRB-ToAddMod ::=                 SEQUENCE {
    srb-Identity                 SRB-Identity,
    -- may only be set if the cell groups of all linked logical channels are reset or released
    reestablishPDCP              ENUMERATED{true}
        OPTIONAL,       -- Cond KeyChange
    pdcp-Config                  PDCP-Config
        OPTIONAL,       -- Cond PDCP
    ...
}
DRB-ToAddModList ::=             SEQUENCE (SIZE (1..maxDRB)) OF DRB-ToAddMod
DRB-ToAddMod ::=                 SEQUENCE {
    cnAssociation                CHOICE {
        -- The EPS bearer ID determines the EPS bearer when NR connects to EPC using EN-DC
        eps-BearerIdentity           INTEGER (0..15)
            OPTIONAL,       -- Cond EPS-DRB-Setup
        --  TheSDAP configuration determines how to map QoS flows to DRBs when NR connects
            to
the 5GC
        sdap-Config                  SDAP-Config
            OPTIONAL        -- Cond NGC
    },
    drb-Identity                 DRB-Identity,
    -- may only be set if the cell groups of all linked logical channels are reset or released
    reestablishPDCP              ENUMERATED{true}
        OPTIONAL,       -- Cond HO
    recoverPDCP                  ENUMERATED{true}
        OPTIONAL,       -- Need N
    pdcp-Config                  PDCP-Config
        OPTIONAL,       -- Cond PDCP
    ...
}
DRB-ToReleaseList ::=            SEQUENCE (SIZE (1..maxDRB)) OF DRB-Identity
SecurityConfig ::=               SEQUENCE {
    securityAlgorithmConfig      SecurityAlgorithmConfig
        OPTIONAL,       -- Need M
    keyToUse                     ENUMERATED{KeNB, S-KgNB}
        OPTIONAL        --Need M
    ...
}
-- TAG-RADIO-BEARER-CONFIG-STOP
-- ASN1STOP
```

There currently exist certain challenge(s). For example, in legacy inter-RAT handover, the UE switches between two disparate systems where very little configurations can be retained. This requires a complete, full reconfiguration, that could incur considerable service interruption times.

As another example, handover from LTE/EPC to LTE/EPC and NR to NR would be considered as intra-RAT, intra-system which would be performed using normal reconfiguration procedures. However, LTE/EPC to or from LTE/5GC would be considered intra-RAT inter-system, LTE/EPC to or from NR would be inter-RAT, inter-system, and LTE/5GC to or from NR would be inter-RAT, intra-system. For intra-system handover, it is for example desirable to support loss-less and in-order data delivery during and after the handover.

Currently, all legacy inter-RAT handover procedures in LTE are treated also as inter-system handovers. In addition, adopting the same behavior to some of the inter-RAT handover cases mentioned above (e.g. LTE/5GC to/from NR) would be inefficient because unnecessary reconfigurations and service interruptions may happen.

SUMMARY

To address the foregoing problems with existing solutions, disclosed are methods, user equipment, network nodes, and systems for inter-RAT handover by preparing a reconfiguration message based on RAT and system combinations between a source node and a target node. The present disclosure implements a solution at a target node to calculate and prepare a configuration in a reconfiguration message for inter-RAT, intra system handover at a user equipment (UE). Furthermore, the UE may only reconfigure lower-layer configurations and keep upper-layer configurations based on the received reconfiguration message. Therefore, the UE may eliminate unnecessary reconfigurations and service interruptions during handover.

Several embodiments are described in this disclosure. According to one embodiment, a method for inter-RAT handover comprises receiving, from a source node, a command containing a reconfiguration message and a RAT indicator, wherein the reconfiguration message is based on characteristics of a target node that are inter-RAT and intra-system to the source node, and the RAT indicator identifies a RAT of the target node. The method additionally comprises reconfiguring, at a user equipment, lower-layer configuration and keeping upper-layer configuration based on the reconfiguration message.

In one embodiment, the source node is Long Term Evolution (LTE) connected to 5G Core Network (5GC), the target node is New Radio (NR), and the reconfiguration message comprises RRCReconfiguration containing NR parameters. In another embodiment, the source node is NR, the target node is LTE connected to 5GC, and the reconfiguration message comprises RRCConnectionReconfiguration containing LTE parameters.

In one embodiment, the reconfiguration message comprises an intra system security container used to configure security configuration.

In one embodiment, the lower-layer configuration comprises configuration for at least one of Radio Link Control (RLC), Medium Access Control (MAC), and Physical Layer (PHY).

In one embodiment, the upper-layer configuration comprises protocol state and configuration for at least one of Service Data Adaptation Protocol (SDAP) and Packet Data Convergence Protocol (PDCP).

In one embodiment, the first network node is LTE connected to 5GC, and the command is MobilityFromEUTRACommand. In another embodiment, the first network node is NR, and the command is MobilityFromNRCommand.

In one embodiment, keeping the configuration for the at least one upper layer comprises maintaining a portion of configurations and modifying a remaining portion of configurations.

According to another embodiment, a method for inter-RAT handover comprises preparing, at a target node, a reconfiguration message based on characteristics of the target node that are inter-RAT and intra-system to a source node, wherein the reconfiguration message comprises configuration for reconfiguring lower layer at a user equipment. The method further comprises sending, to the source node, the reconfiguration message for forwarding the reconfiguration message to the user equipment.

In one embodiment, the configuration for reconfiguring lower layer comprises configuration for at least one of RLC, MAC, and PHY.

In one embodiment, the reconfiguration message further indicates keeping protocol state and configuration for upper layer. The upper layer comprises at least one of SDAP and PDCP.

In one embodiment, the reconfiguration message further comprises configurations for at least one upper layer, wherein the configurations for the at least one upper layer is for maintaining a portion of configurations and modifying a remaining portion of configurations.

According to yet another embodiment, a UE for inter-RAT handover comprises at least one processing circuitry and at least one storage that stores processor-executable instructions. When executed by the processing circuitry, causes the UE to receive, from a source node, a command containing a reconfiguration message and a RAT indicator, wherein the reconfiguration message is prepared by a target node based on that the target node is inter-RAT and intra-system to the source node, and the RAT indicator identifies a RAT of the target node; and reconfigure lower-layer configuration and keep upper-layer configuration based on the reconfiguration message.

According to yet another embodiment, a network node for inter-RAT handover comprises at least one processing circuitry and at least one storage that stores processor-executable instructions. When executed by the processing circuitry, causes the network node to prepare a reconfiguration message based on that the network node is inter-RAT and intra-system to a source node, wherein the reconfiguration message comprises configuration for reconfiguring lower layer at a user equipment; and send, to the source node, the reconfiguration message for forwarding the reconfiguration message to the user equipment.

According to yet another embodiment, a network node for intra-RAT handover comprises at least one processing circuitry and at least one storage that stores processor-executable instructions. When executed by the processing circuitry, causes a network node to receive, from a second network node, a reconfiguration message, wherein the reconfiguration message is based on characteristics of the second network node that is intra-RAT and inter-system to the network node, and the reconfiguration message comprises configuration for reconfiguring lower layer at a user equipment; and forward, to the user equipment, a command containing the reconfiguration message and an indicator for target RAT, wherein the command indicates that the second network node is intra-RAT and inter-system to the network node.

According to yet another embodiment, a communication system for inter-RAT handover comprises at least two network nodes and at least one UE. A source node in the communication system comprises at least one processing circuitry configured to identify that a target node is inter-RAT and intra-system to the source node; and signal, to the target node, an identification indicating that the target node is inter-RAT and intra-system to the source node. The target node in the communication system comprises at least one processing circuitry configured to receive, from the source node, the identification indicating that the target node is inter-RAT and intra-system to the source node; prepare a reconfiguration message based on characteristics of the target node that are inter-RAT and intra-system to the source node; and send, to the source node, the reconfiguration message. The source node is further configured to receive, from the target node, the reconfiguration message; and send, to a user equipment, a command containing the reconfiguration message and a RAT indicator, wherein the RAT indicator identifies a RAT of the target node. The user equipment in the communication system comprises at least one processing circuitry configured to receive, from the source node, the command containing the reconfiguration message and the RAT indicator; and reconfigure lower-layer configuration and keep upper-layer configuration based on the reconfiguration message.

Certain embodiments may provide one or more of the following technical advantage(s). The methods disclosed in the present disclosure may offer an effective handover without unnecessary reconfigurations at the UE, especially for an inter-RAT, intra system handover. Another advantage is that the methods may enhance the security of the network by utilizing the same security parameters to configure the security layer when the reconfiguration message indicates that the handover is intra system.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

Figure 1:
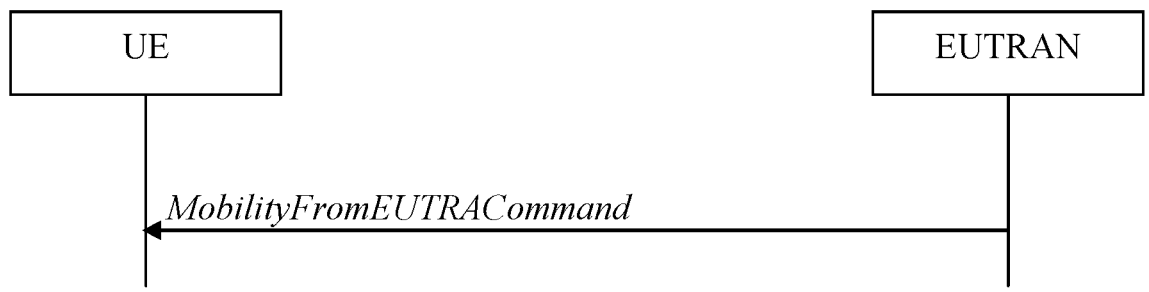
FIG. 1 illustrates an example tunneling scheme with MobilityFromEUTRACommand message sent by the source node.
Figure 2:
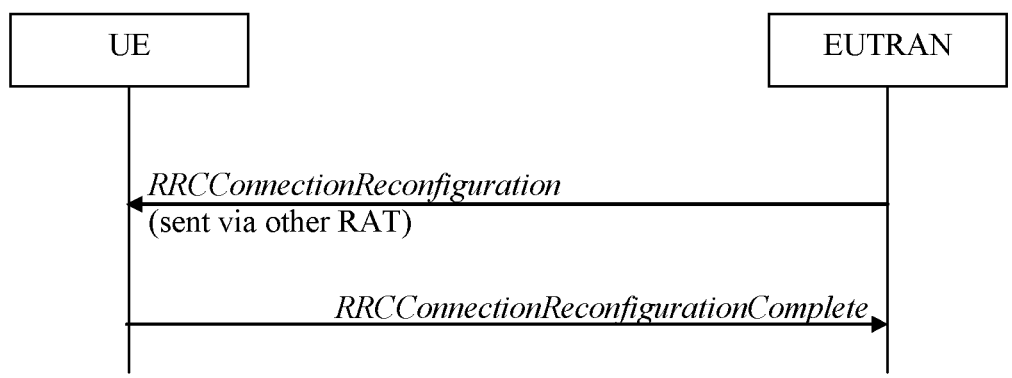
FIG. 2 illustrates an example tunneling scheme with the RRCConnectionReconfiguration message delivered to the UE.
Figure 3:
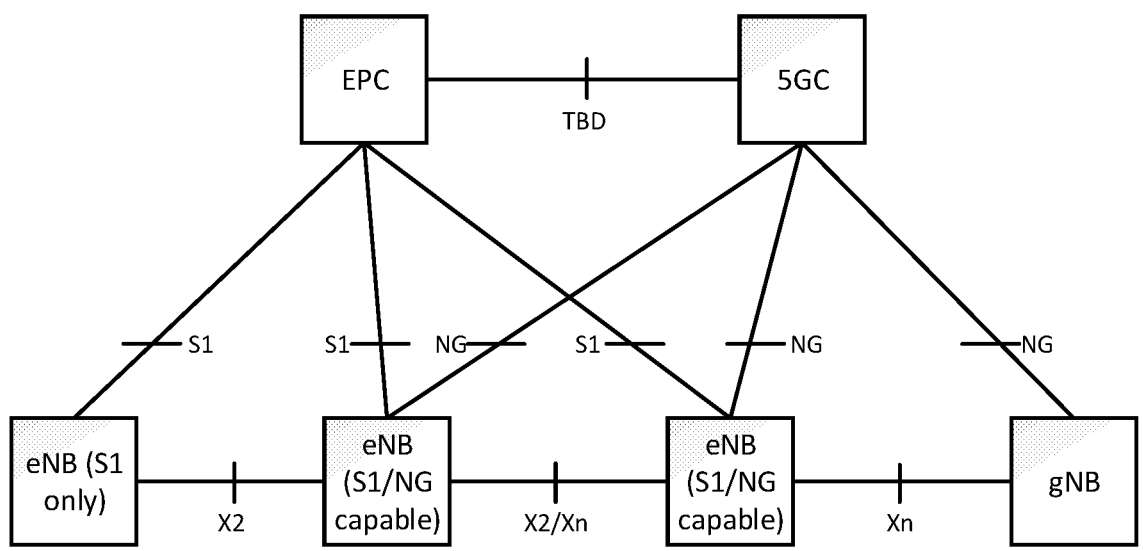
FIG. 3 illustrates an example architecture for LTE connected to 5GC and EPC, and NR.
Figure 4:
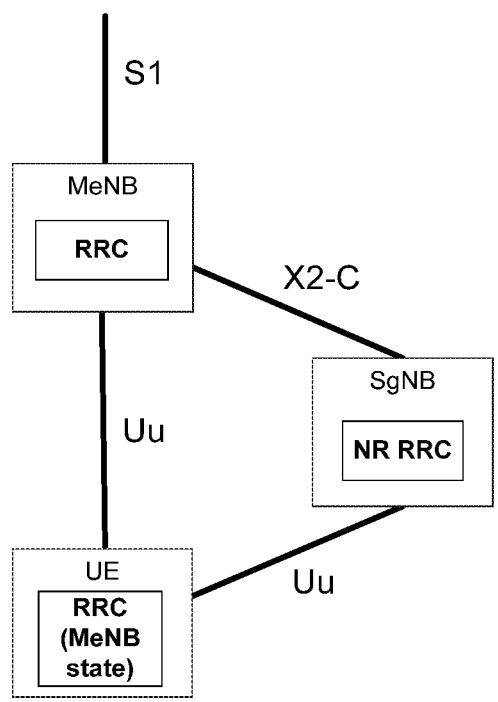
FIG. 4 illustrates an example control plane architecture for EN-DC.
Figure 5:
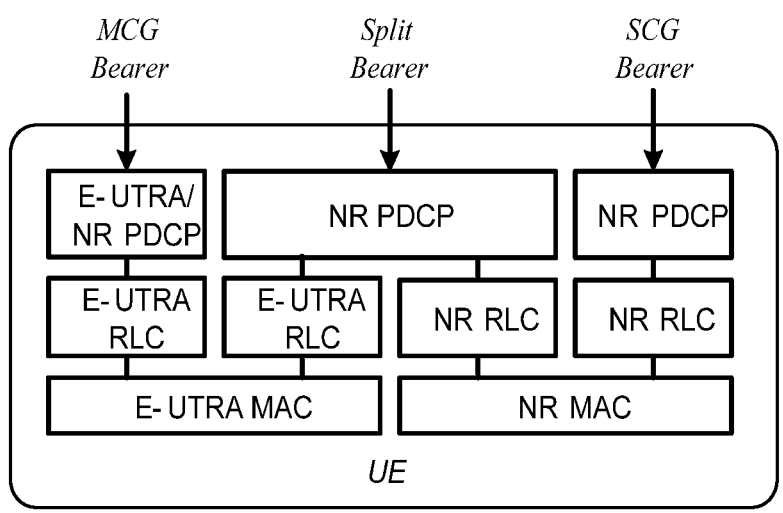
FIG. 5 illustrates an example radio protocol architecture for MCG, SCG and split bearers in MR-DC with EPC.
Figure 6:
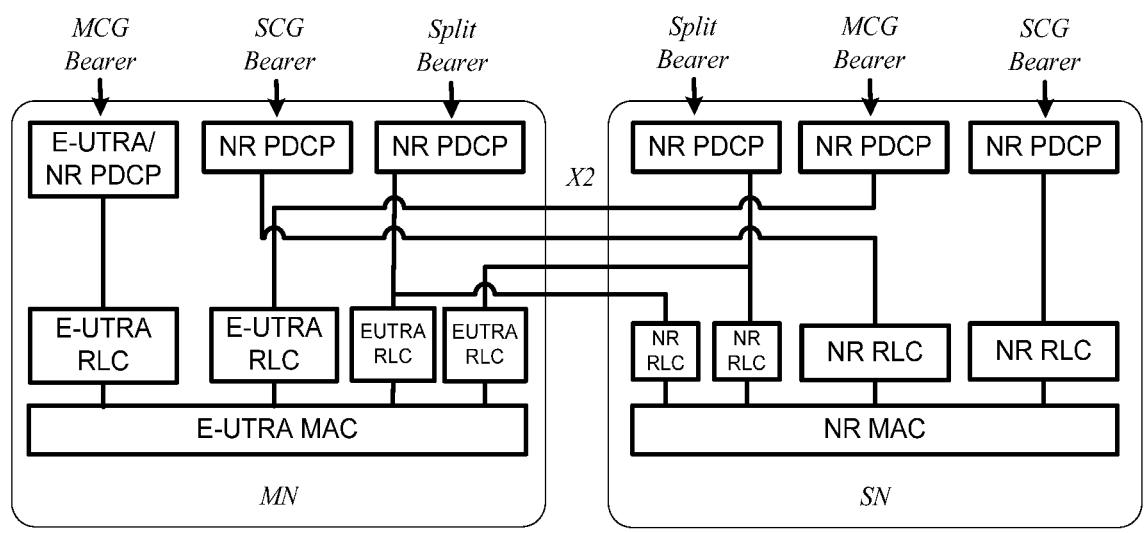
FIG. 6 illustrates an example network side protocol termination options for MCG, SCG and split bearers in MR-DC with EPC.

Particular embodiments of the present disclosure propose a method to prepare a reconfiguration message by a target node based on a type of handover to avoid unnecessary resets or reconfigurations at a user equipment. That is, if the handover is intra-system, inter-RAT, the reconfiguration message will be delivered to the UE as an inter-RAT message, but the content of the reconfiguration message and the procedures will be similar to intra-RAT handover. Particular embodiments enable the possibility to keep the bearer configuration and protocol states, and enable loss-less, in-order user data delivery during and after the handover. Furthermore, a source node may forward the reconfiguration message in a mobility form command to the UE without understanding the content of the reconfiguration message. In this way, particular embodiments of the present disclosure may reduce potential delays or additional operations.

Particular embodiments of the present disclosure may also apply to various handover scenarios. If the handover is inter-system, intra-RAT, the reconfiguration message prepared by the target node of the present disclosure will be delivered as inter-RAT, and the content and procedures will be similar to inter-RAT handover. In this case, the bearer configuration will not be kept. For inter-system, intra-RAT handover, particular embodiments may reuse the inter-RAT procedure instead of using a legacy intra-RAT procedure, in which the target node would possibly not understand a source node reconfiguration message. Likewise, if the handover is inter-system, inter-RAT, the reconfiguration message will be delivered as inter-RAT, and the content and procedures will be similar to inter-RAT handover. In this case the bearer configuration will not be kept.

The advantage of the particular embodiments of the present disclosure is that intra-system, inter-RAT handovers may be performed with reduced interruption times and loss-less, in-order packet delivery compared to existing inter-RAT handovers as the core network connections and the bearer and PDCP configurations are not reset but only reconfigured.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 7:
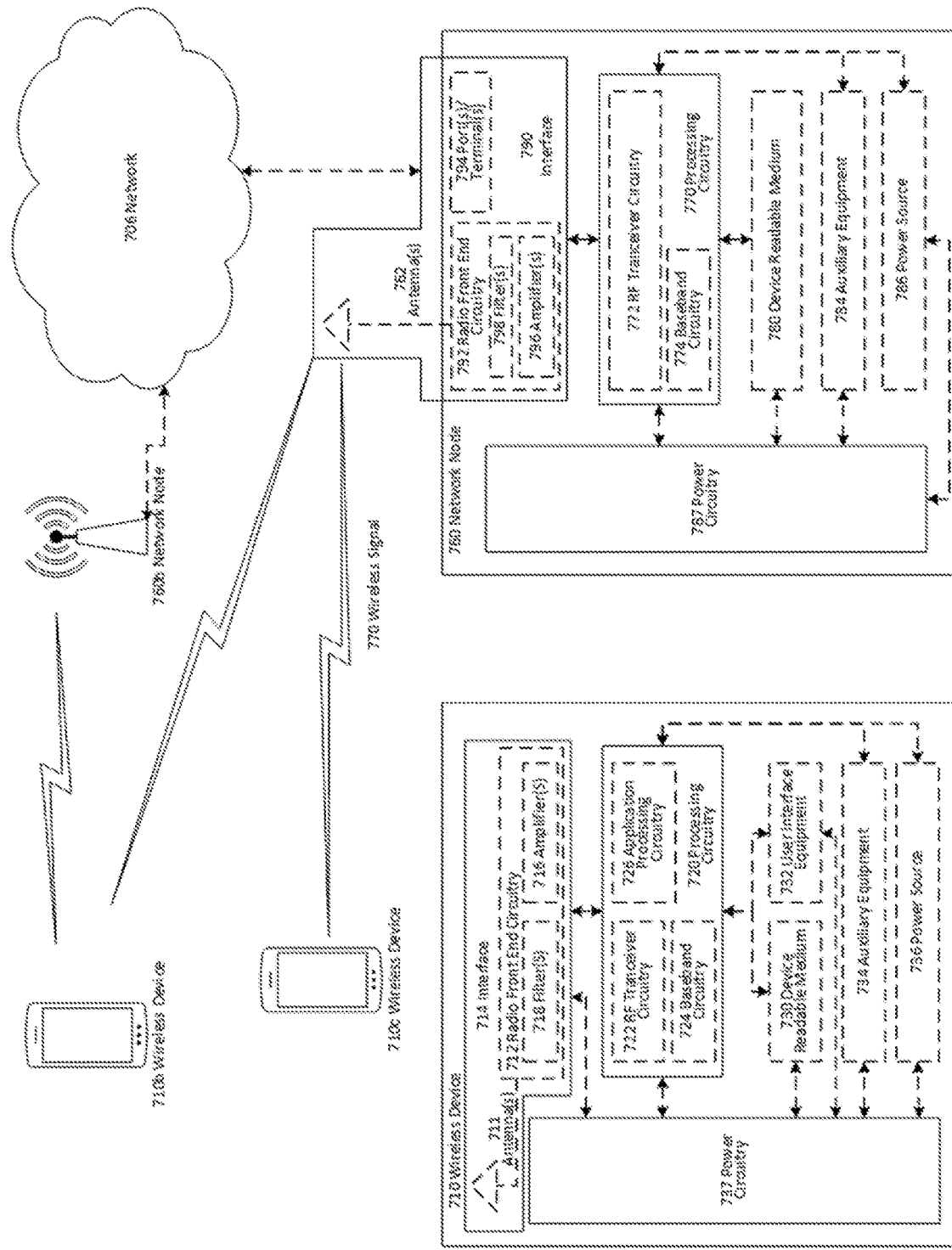
FIG. 7 illustrates an example wireless network, in accordance with certain embodiments.

FIG. 7 is an example wireless network, according to certain embodiments in accordance with certain embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. In some embodiments, the network node 760 may be a base station which is further depicted in FIGS. 10 and 11. In some embodiments, the network node 760 may be a network node which is further depicted in FIG. 19. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination. In some embodiments, network node 760 may carry out the method described with respect to FIG. 17.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signaling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710. In some embodiments, the wireless device 710 may be a user equipment which is further depicted in FIGS. 10 and 11. In some embodiments, the wireless device 710 may be a user equipment which is further depicted in FIG. 18.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionalities described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination. In some embodiments, WD 710 may carry out the method described with respect to FIG. 16.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment

732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Regarding alignment of security parameters for LTE connected to 5GC towards NR, in EN-DC, it has been agreed that when NR PDCP is used, it may be configured by NR RRC information elements (IEs) embedded in LTE RRC. The security algorithms for bearers using NR PDCP are configured using NR RRC IEs. Also, the NR algorithm names are used.

A similar approach may be adopted for the case of LTE connected to 5GC. For LTE connected to 5GC, it has been agreed to use NR PDCP for all radio bearers. This means that the upper layer of the bearers may be configured with NR RRC specified in 3GPP TS 38.331. This may also include the security configuration for these bearers including, for example, security algorithms, Next Hop Chaining Counter (NCC), and NAS security parameters. Therefore, NR PDCP usage for LTE connected to 5GC may be similar to EN-DC which is configured using NR RRC IEs embedded in LTE RRC. Similar to EN-DC, the security algorithms may also be configured using the NR namespace.

A consequence of signaling algorithms using NR RRC is that the LTE RRC Security Mode Command (SMC) procedure performed when UEs are connecting to LTE. The SMC procedure is used to signal which algorithm may be used for Signaling Radio Bearer 1 (SRB1). The SMC procedure may be extended to include the NR algorithms since SRB1 uses NR PDCP at this point. Unfortunately, in the current version of LTE RRC, the algorithms are mandatory in the LTE SMC message. Therefore, either the message needs to be critically extended or the UE ignore the LTE algorithms, or a new message may be defined. In conclusion, the security mode command message for LTE connected to 5GC is able to configure NR security algorithms, which are to be sent as an embedded NR RRC IEs, either by applying critical extension to LTE RRC SMC, creating a new RRC SMC for this case, or adding a non-critical extension and specifying that the LTE UE connectivity to 5GC may ignore the LTE algorithms.

In particular embodiments for different types of handover, a UE is served by a source node A adopting a source RAT, and measurements indicate that the UE should handover to a target node B. Note that the source node A may have prior information of UE capabilities and which CN it is using. Source node A identifies target node B and which RAT and CN it belongs to. If the interface between the source node A and the target node B is Xn, then both nodes support 5GC. If the interface between the source node A and the target node B is only X2, then at least one of them supports EPC. In this case, if source RAT is NR, then target RAT is LTE/EPC, otherwise, if source RAT is LTE/EPC, then target RAT is NR. If neither X2 or Xn is supported, NG or S1 signaling via CN is used. The signaling via the CN may be used to determine which CN the target node B is connected to. Note that both Xn and X2 interface may be present simultaneously.

In a first embodiment, if the target node B is inter-RAT, inter-system, for example, NR to/from LTE connected to EPC, the target node B may prepare an RRC reconfiguration message with full configuration, which may be RRCConnectionReconfiguration in LTE or RRCReconfiguration in NR, with the fullconfig flag set. The target node B may then send the RRC reconfiguration message to the source node A.

The source node A may send a MobilityFrom(XX)Command containing the RRC reconfiguration message, wherein XX may be E-UTRA/NR. The MobilityFrom(XX)Command may contain a targetRAT indicator that identifies the target RAT. Note that the MobilityFrom(XX)Command may let the source node A send the RRC reconfiguration message, even if it doesn't understand all the content.

The UE receives the MobilityFrom(XX)Command with a targetRAT indicator. In one embodiment, if the target RAT is LTE, the UE will be reconfigured fully with LTE RRC configuration, RRCConnectionReconfiguration, including legacy "inter-RAT" security configuration included in the SecurityConfigHO is used. In another embodiment, if the target RAT is NR, the UE uses the full reconfiguration provided via NR RRCReconfiguration it has received.

In a second embodiment, if the target node B is inter-RAT, intra-system, for example, NR to/from LTE connected to 5GC, the target node B may prepare an RRC reconfiguration message, which may be RRCConnectionReconfiguration in LTE or RRCReconfiguration in NR. The target node B may then send the RRC reconfiguration message to the source node A. The RRC reconfiguration message will completely reconfigure the lower layer (RLC/MAC/PHY) configuration of the UE considering the target RAT. However, the UE will keep the upper layer (PDCP/SDAP) configuration in order to enable loss-less handover. For example, the UE may maintain the protocol state and the configuration for the upper layer. In this case, the reconfiguration performed at the UE may be considered as a configuration between a full and delta configuration.

The source node A may send a MobilityFrom(XX)Command containing the RRC reconfiguration message with a targetRAT indicator, wherein XX=E-UTRA/NR. Note that the MobilityFrom(XX)Command may let the source node A send the RRCReconfiguration message even if it doesn't understand all the content. The UE receives the MobilityFrom(XX)Command with a targetRAT indicator. When the UE receives the RRC reconfiguration message tunneled inside the MobilityFrom(XX)Command, it will only reset the lower protocol layers (RLC/MAC/PHY) since this is an intra-System handover, but keep the upper layer (SDAP/PDCP) protocol state and configuration enabling support for loss-less, in-order delivery of PDCP packets in target RAT. Note that the UE will not consider the inter-RAT security parameters in SecurityConfigHO, but instead it uses the security parameters included in the NR configuration.

In a third embodiment, if the target node B is intra-RAT, inter-system, for example, LTE connected to EPC to/from LTE connected to 5GC. The target node B may prepare a full RRC reconfiguration message, which may be RRCConnectionReconfiguration in LTE connected to EPC or RRCReconfiguration in LTE connected to 5GC. The target node B may then send the RRC reconfiguration message to the source node A.

Source node A may send a MobilityFromEUTRACommand containing the RRC reconfiguration message. The MobilityFromEUTRACommand may also contain a target-RAT indicator. Note that the MobilityFromEUTRACommand may let the source node A send the RRC reconfiguration message even if it doesn't understand all the content.

The UE receives the MobilityFromEUTRACommand with a targetRAT indicator E-UTRA. Since the source and target RAT are both LTE but connected to EPC and 5GC respectively. The usage of the MobilityFromEUTRACommand with the targetRAT indicator set to E-UTRA indicates that it is inter-system, intra-RAT handover. The UE may perform full RRCConnectionReconfiguration as specified in TR 36.331.

If the UE was using LTE connected to 5GC, the UE will consider the inter-RAT security parameters in SecurityConfigHO. Otherwise, the UE will consider the security parameters included in the NR configuration.

In some embodiments, if the target node B is intra-RAT, inter-system to the source network node, a source node for intra-RAT handover may comprise at least one processing circuitry; and at least one storage that stores processor-executable instructions, when executed by the processing circuitry, causes the source node to receive, from the target node, a reconfiguration message, wherein the reconfiguration message is based on characteristics of the target node that are intra-RAT and inter-system to the source node, and the reconfiguration message comprises configuration for reconfiguring lower layer at a UE; and forward, to the UE, a command containing the reconfiguration message and an indicator for target RAT, wherein the command indicates that the target node is intra-RAT and inter-system to the source node.

Below is Table 5 showing possible means on how the UE may determine which type of handover it is and the corresponding UE behavior.

TABLE 5

| Source (RAT/CN) | Target (RAT/CN) | Handover (HO) type | Method to configure Security configuration which could also be used to determine handover type | Method to determine handover type |
| --- | --- | --- | --- | --- |
| LTE/EPC | LTE/EPC | Intra-system, intra-RAT | HO type intra-LTE (LTE RRC 36.331) | UE only receives RRCConnectionReconfiguration (36.331) |
| LTE/EPC | LTE/5GC | Inter-system, intra-RAT | Inter-system security container (new IE in NR RRC 38.331) | UE in LTE/EPC receives MobilityFromEUTRACommand with targetRAT = E-UTRA and LTE RRCConnectionReconfiguration (36.331) containing NR parameters (38.331). |
| LTE/EPC | NR | Inter-system, inter-RAT | Inter-system security IE in NR RRC 38.331, no container | UE receives MobilityFromEUTRACommand with targetRAT = NR and NR RRCReconfiguration (38.331) |
| LTE/5GC | LTE/EPC | Inter-system, intra-RAT | HO type inter-RAT (36.331) | UE in LTE/5GC receives MobilityFromEUTRACommand with targetRAT = E-UTRA and RRCConnectionReconfiguration (36.331) |
| LTE/5GC | LTE/5GC | Intra-system, intra-RAT | Intra-system security container (new IE in NR RRC 38.331) | UE only receives RRCConnectionReconfiguration (36.331) containing NR parameters (38.331). |
| LTE/5GC | NR | Intra-system, inter-RAT | Intra-system security container (new IE in NR RRC 38.331) | UE receives MobilityFromEUTRACommand with targetRAT = NR and RRCReconfiguration (38.331) |
| NR | LTE/EPC | Inter-system, inter-RAT | HO type inter-RAT (36.331) | UE receives MobilityFromNRCommand with targetRAT = E-UTRA and SecurityCommandHO with inter-RAT parameters (36.331) |
| NR | LTE/5GC | Intra-system, inter-RAT | Intra-system security container (new IE in NR RRC 38.331) | UE receives MobilityFromNRCommand with targetRAT = E-UTRA and RRCConnectionReconfiguration (36.331) containing NR parameters (38.331) |
| NR | NR | Intra-system, intra-RAT | Intra-system security IE in NR RRC 38.331 | UE only receives RRCReconfiguration (38.331). |

Particular embodiments above for intra-system, inter-RAT handover are also applicable for UEs moving in RRC INACTIVE state between LTE and NR. In this case, the UE will also keep the upper layer (SDAP/PDCP) configuration while the lower layer (RLC/MAC/PHY) configuration which is RAT specific is reset.

Figure 8:
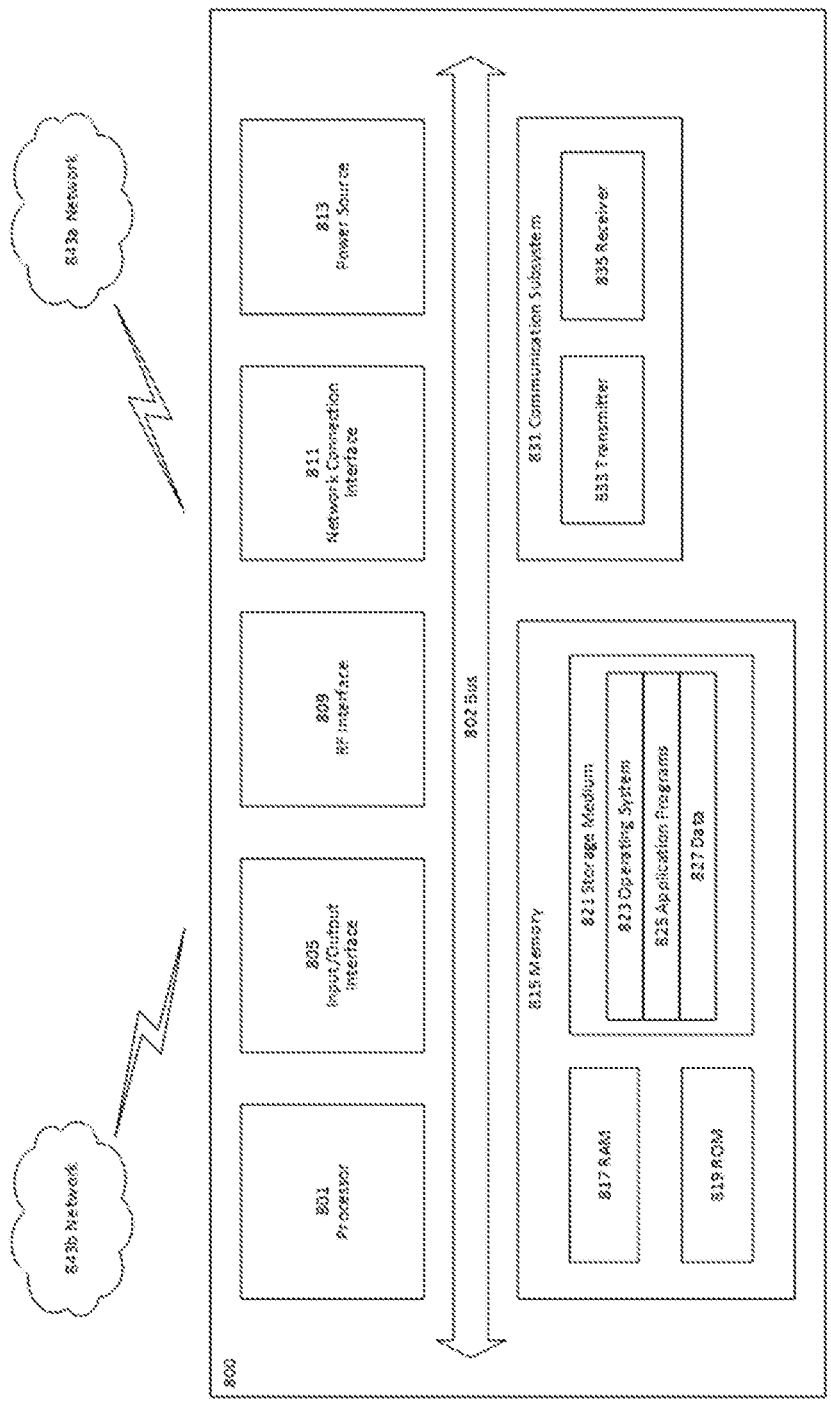
FIG. 8 illustrates an example user equipment, in accordance with certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the 3rd Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
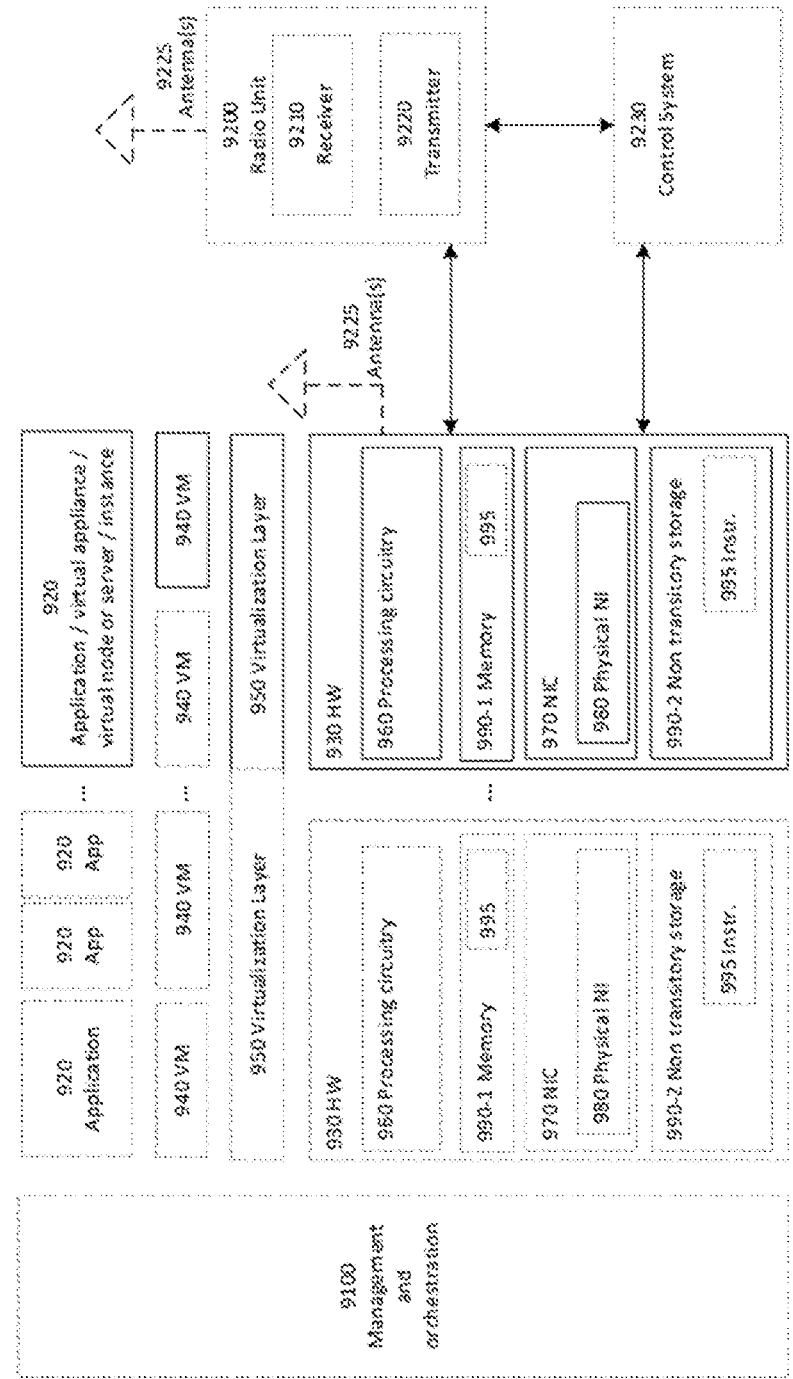
FIG. 9 illustrates an example virtualization environment, in accordance with certain embodiments.

FIG. 9 illustrates an example virtualization environment, according to certain embodiments. FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be affected with the use of control system 9230 which may alternatively be used for communication between the hardware nodes 930 and radio units 9200.

Figure 10:
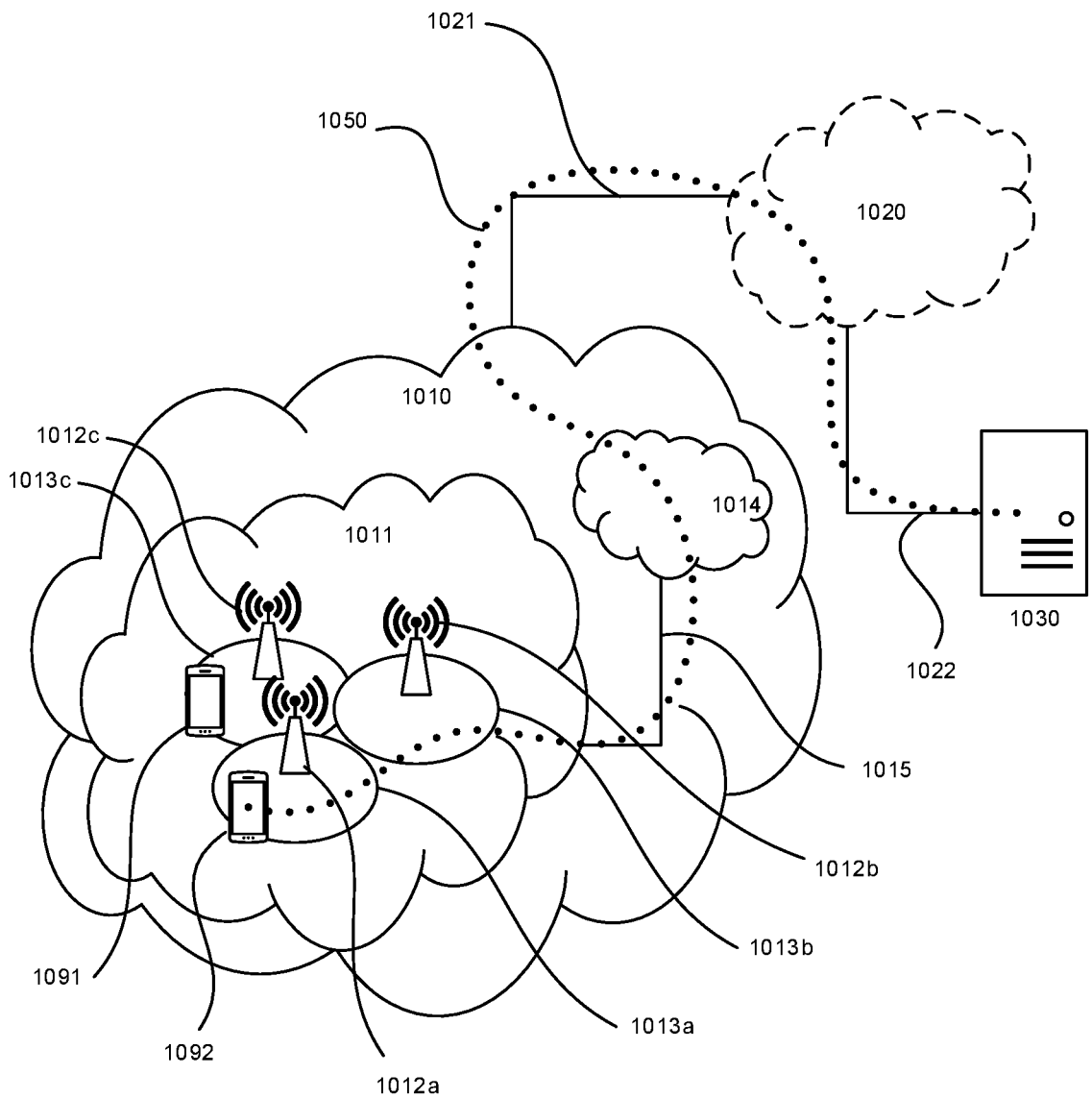
FIG. 10 illustrates an example telecommunication network connected via an intermediate network to a host computer, in accordance with certain embodiments.

FIG. 10 illustrates an example telecommunication network connected via an intermediate network to a host computer, according to certain embodiments. With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. In certain embodiments, the plurality of base stations 1012a, 1012b, 1012c may perform the functionality of network node as described with respect to FIG. 19. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
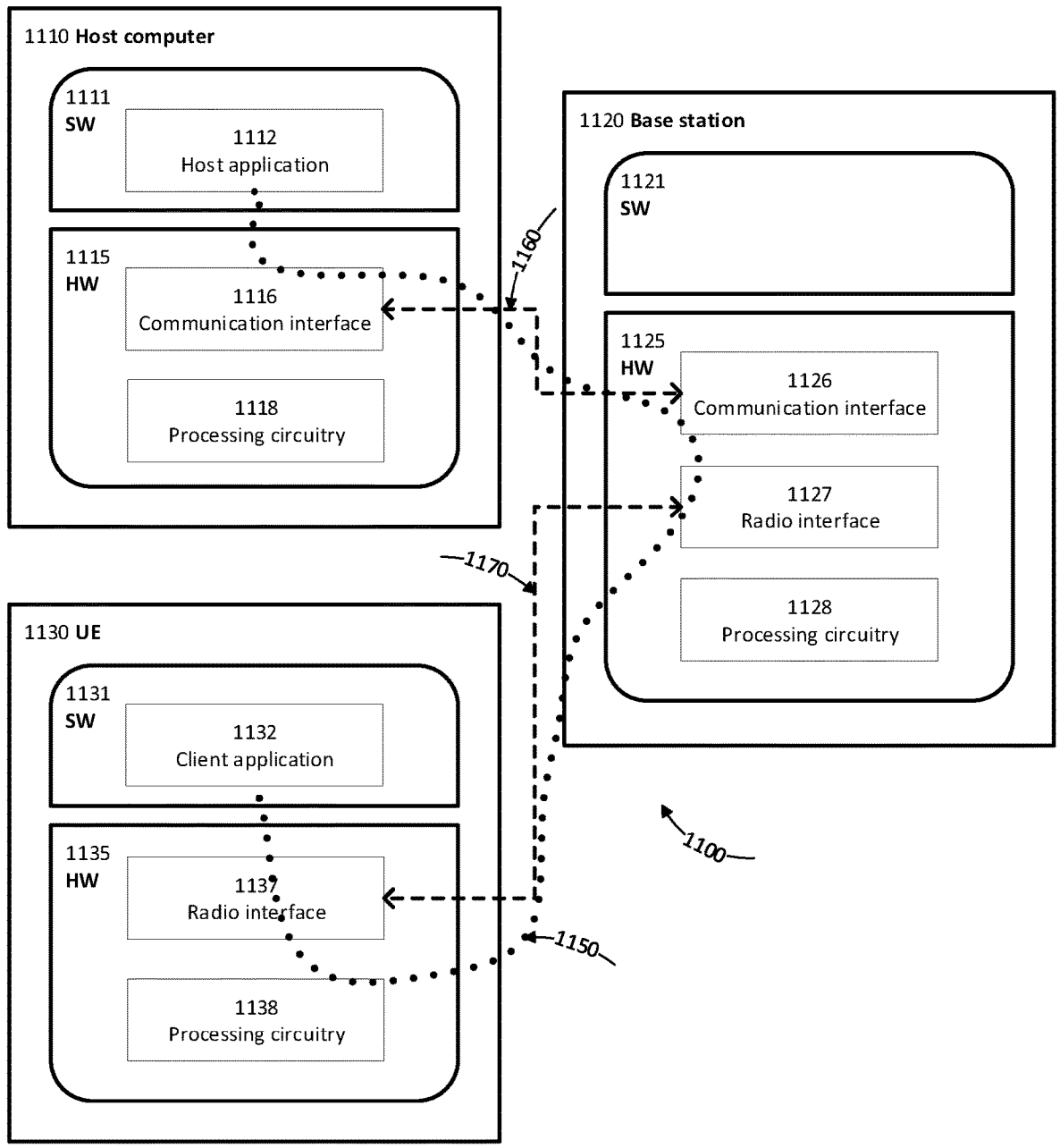
FIG. 11 illustrates an example host computer communicating via a base station with a user equipment over a partially wireless connection, in accordance with certain embodiments.

FIG. 11 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. In certain embodiments, the base station 1120 may be a network node depicted in FIG. 19. In certain embodiments, the UE 1130 may be a user equipment depicted in FIG. 18. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct, or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. In another embodiment, hardware 1125 of base station 1120 further includes another processing circuitry to perform the method which is further depicted in FIG. 17. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
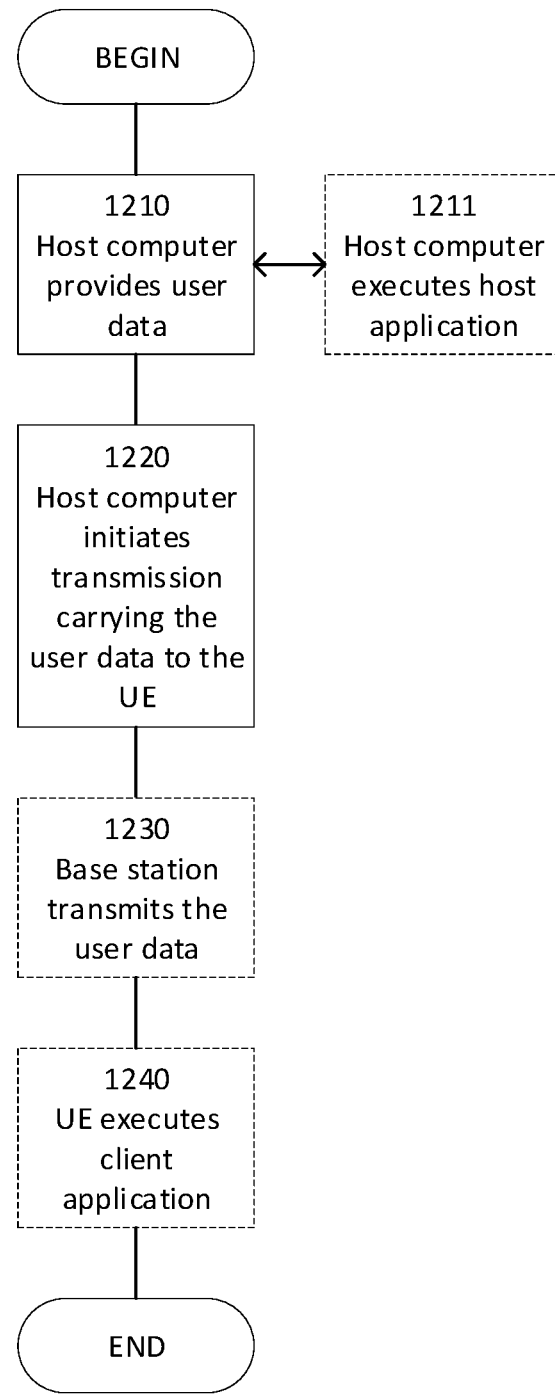
FIG. 12 illustrates an example method implemented in a communication system including a host computer, a base station and a user equipment, in accordance with certain embodiments.

FIG. 12 illustrates an example method implemented in a communication system including a host computer, a base station and a user equipment, according to certain embodiments in accordance with some embodiments. More specifically, FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
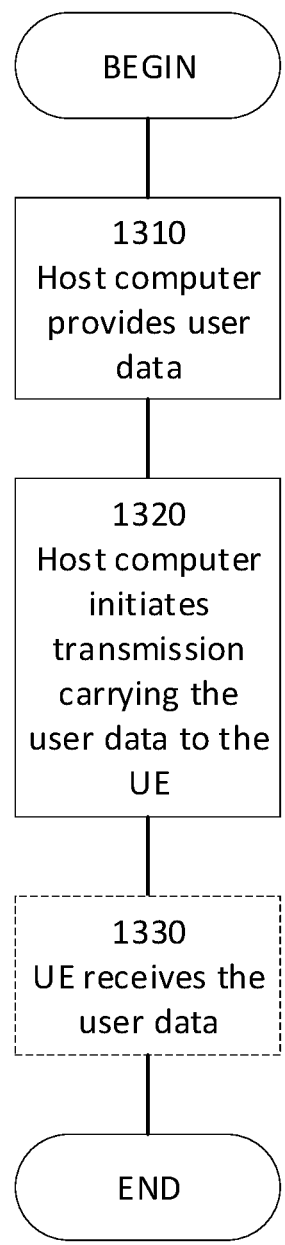
FIG. 13 illustrates another example method implemented in a communication system including a host computer, a base station and a user equipment, in accordance with certain embodiments.

FIG. 13 illustrates an example method implemented in a communication system including a host computer, a base station and a user equipment, in accordance with some embodiments. More specifically, FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
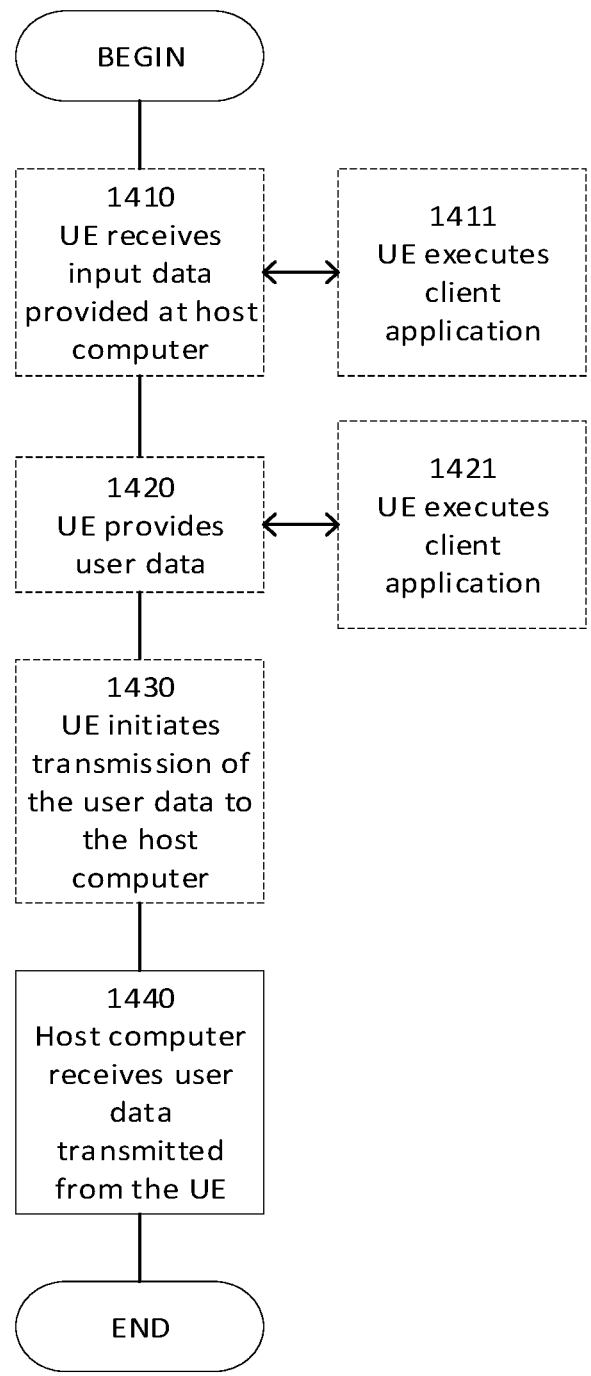
FIG. 14 illustrates another further example method implemented in a communication system including a host computer, a base station and a user equipment, in accordance with certain embodiments.

FIG. 14 illustrates another further example method implemented in a communication system including a host computer, a base station and a user equipment, in accordance with some embodiments. More specifically, FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
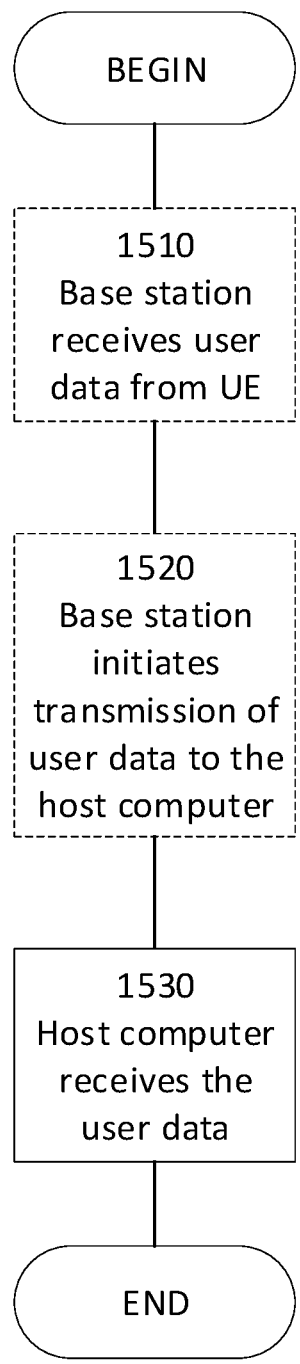
FIG. 15 illustrates another yet example method implemented in a communication system including a host computer, a base station and a user equipment, in accordance with certain embodiments.

FIG. 15 illustrates another example method implemented in a communication system including a host computer, a base station and a user equipment, in accordance with some embodiments. More specifically, FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
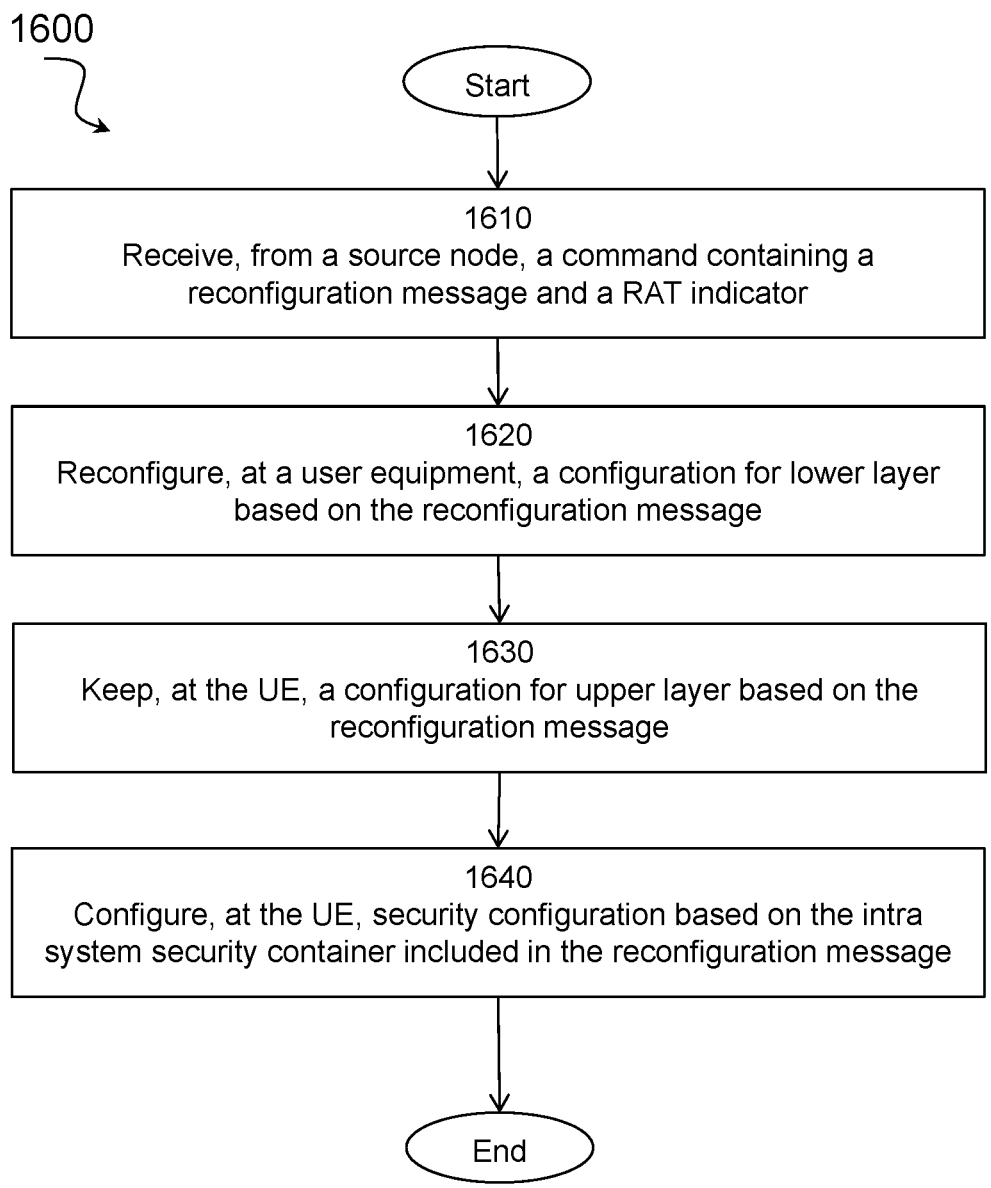
FIG. 16 illustrates a flow diagram of an example method in a user equipment, in accordance with certain embodiments.

FIG. 16 is a flow diagram of a method in a network node, in accordance with certain embodiments. Method 1600 begins at step 1610 with a UE, receiving a command containing a reconfiguration message and a RAT indicator from a source node. In some embodiments, the reconfiguration message may be prepared by a target node based on the type of handover. In some embodiments, the reconfiguration message may be based on characteristics of the target node. In one embodiment, the handover may be inter-RAT and intra-system. In some embodiments, the RAT indicator may identify a RAT of the target node. In one embodiment, the source node may be LTE connected to 5GC and the target node may be NR. In another embodiment, the source node may be NR and the target node may be LTE connected to 5GC. In some embodiments, when the target node is NR, the reconfiguration message may comprise RRCReconfiguration containing NR parameters. In some embodiments, when the target node is LTE connected 5GC, the reconfiguration message may comprise RRCConnectionReconfiguration containing LTE parameters. In some embodiments, when the target node is LTE connected to 5GC, the command is MobilityFromEUTRACommand. In some embodiments, when the target node is NR, the command is MobilityFromNRCommand. At step 1620, the UE reconfigures a configuration for lower layer(s) based on the reconfiguration message. In some embodiments, the lower layer may comprise RLC, MAC, and/or PHY.

At step 1630, the UE keeps a configuration for upper layer(s) based on the reconfiguration message. For example, the UE may maintain the configuration for upper layer(s). In some embodiments, the configuration for upper layer(s) may comprise protocol state and configuration for SDAP and/or PDCP. In some embodiments, keeping the configuration for the upper layer may comprise maintaining a portion of configurations and modifying a remaining portion of configurations.

At step 1640, the UE configures security configuration based on an intra system security container used to configure security configuration. In some embodiments, security parameters included in the intra system security may be used in both NR and LTE connected to 5GC.

Figure 17:
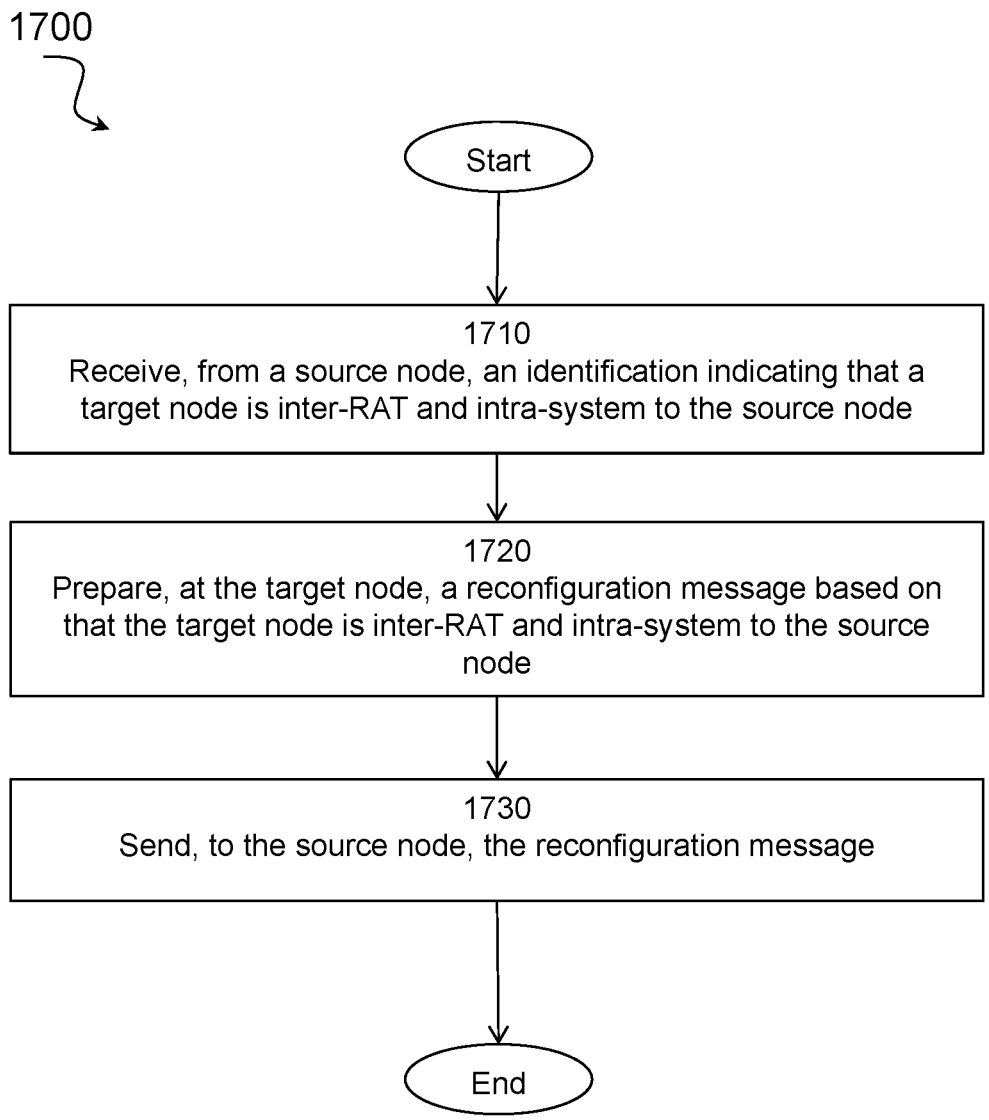
FIG. 17 illustrates a flow diagram of an example method in a network node, in accordance with certain embodiments.

FIG. 17 is a flow diagram of a method in a network node, in accordance with certain embodiments. Method 1700 begins at step 1710 with a target network node, receiving an identification from a source node. In some embodiments, the identification may indicate that the target node is inter-RAT and intra-system to the source node.

At step 1720, the target node prepares a reconfiguration message based on that the target node is inter-RAT and intra-system to the source node. In some embodiments, the reconfiguration message may be based on characteristics of the target node. In some embodiments, the reconfiguration message may comprise a configuration for reconfiguring lower layer(s) at a user equipment. In some embodiments, the reconfiguration message may further indicate keeping protocol state and configuration for upper layer(s). For example, the reconfiguration message may indicate maintaining the protocol state and the configuration for the upper layer(s). In some embodiments, the reconfiguration message may be prepared by the target node based on the type of handover. In one embodiment, the source node may be LTE connected to 5GC and the target node may be NR. In another embodiment, the source node may be NR and the target node may be LTE connected to 5GC. In some embodiments, when the target node is NR, the reconfiguration message may comprise RRCReconfiguration containing NR parameters. In some embodiments, when the target node is LTE connected 5GC, the reconfiguration message may comprise RRCConnectionReconfiguration containing LTE parameters. In some embodiments, the reconfiguration message may comprise an intra system security container used to configure security configuration. In some embodiments, the configuration for reconfiguring lower layer may comprise a configuration for at least one of RLC, MAC, and PHY. In some embodiments, the upper layer may comprise SDAP and/or PDCP. In some embodiments, the reconfiguration message may further comprise configurations for a upper layer, wherein the configurations for the upper layer is for maintaining a portion of configurations and modifying a remaining portion of configurations.

At step 1730, the target node sends the reconfiguration message to the source node for forwarding the reconfiguration message to a UE.

Figure 18:
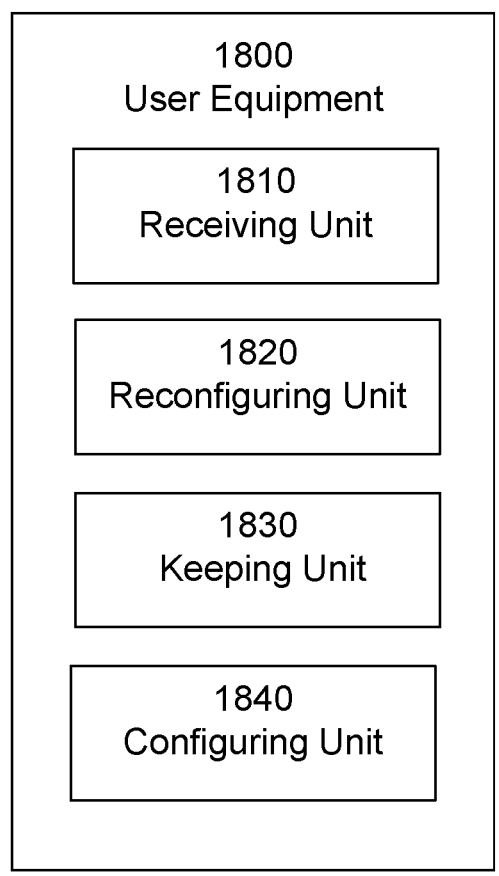
FIG. 18 illustrates a block schematic of an example user equipment, in accordance with certain embodiments.

FIG. 18 is a schematic block diagram of an exemplary user equipment, in accordance with certain embodiments. The user equipment 1800 may be used in a wireless network, e.g. the wireless network 706 shown in FIG. 7. In certain embodiments, the user equipment 1800 may be implemented in a wireless device 710 shown in FIG. 7. The user equipment 1800 is operable to carry out the example method described with reference to FIG. 16 and possibly any other processes or methods disclosed herein. It is also to be understood that the method in FIG. 16 are not necessarily carried out solely by user equipment 1800. At least some operations of the method can be performed by one or more other entities.

User equipment 1800 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1800 may be the processing circuitry 720 shown in FIG. 7. In some embodiments, the processing circuitry of user equipment 1800 may be the processor 801 shown in FIG. 8. The processing circuitry may be configured to execute program code stored in memory 815 shown in FIG. 8, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1810, reconfiguring unit 1820, keeping unit 1830, configuring unit 1840, and any other suitable units of user equipment 1800 to perform corresponding functions according one or more embodiments of the present disclosure, such as a transmitter, a receiver, and a processor.

As illustrated in FIG. 18, user equipment 1800 includes receiving unit 1810, reconfiguring unit 1820, keeping unit 1830, and configuring unit 1840. The receiving unit 1810 may be configured to receive a command containing a reconfiguration message and a RAT indicator from a source node. In some embodiments, the reconfiguration message may be prepared by a target node based on the type of handover. In some embodiments, the reconfiguration message may be based on characteristics of the target node. In one embodiment, the handover may be inter-RAT and intra-system. In some embodiments, the RAT indicator may identify a RAT of the target node. In one embodiment, the source node may be LTE connected to 5GC and the target node may be NR. In another embodiment, the source node may be NR and the target node may be LTE connected to 5GC. In some embodiments, when the target node is NR, the reconfiguration message may comprise RRCReconfiguration containing NR parameters. In some embodiments, when the target node is LTE connected 5GC, the reconfiguration message may comprise RRCConnectionReconfiguration containing LTE parameters. In some embodiments, when the target node is LTE connected to 5GC, the command is MobilityFromEUTRACommand. In some embodiments, when the target node is NR, the command is MobilityFromNRCommand.

The reconfiguring unit 1820 may be configured to reconfigure a configuration for lower layer(s) based on the reconfiguration message. In some embodiments, the lower layer may comprise RLC, MAC, and/or PHY.

The keeping unit 1830 may be configured to keep a configuration for upper layer(s) based on the reconfiguration message. For example, the keeping unit 1830 may maintain the configuration for upper layer(s). In some embodiments, the configuration for upper layer(s) may comprise protocol state and configuration for SDAP and/or PDCP. In some embodiments, the keeping unit 1830 may keep the configuration for the upper layer by maintaining a portion of configurations and modifying a remaining portion of configurations.

The configuring unit 1840 may be configured to configure security configuration based on an intra system security container used to configure security configuration. In some embodiments, security parameters included in the intra system security may be used in both NR and LTE connected to 5GC.

Figure 19:
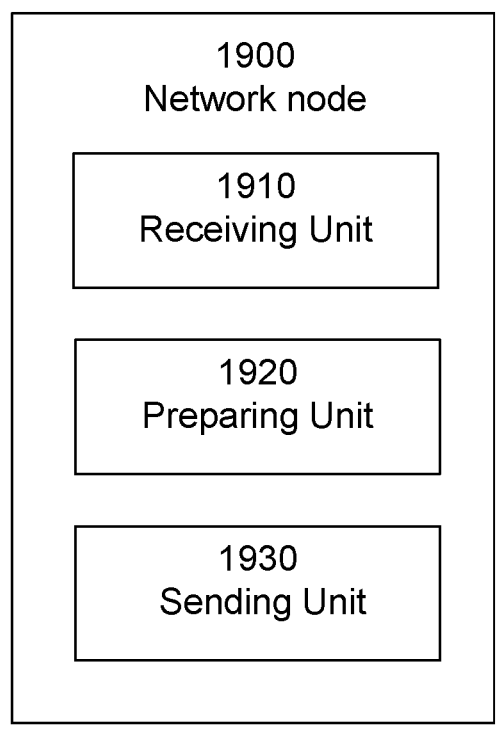
FIG. 19 illustrates a block schematic of an example network node, in accordance with certain embodiments.

FIG. 19 is a schematic block diagram of an exemplary network node, in accordance with certain embodiments. The network node 1900 may be used in a wireless network (for example, the wireless network shown in FIG. 7). The network node 1900 may be implemented in a network node 760 shown in FIG. 7. The network node 1600 is operable to carry out the example method described with reference to FIG. 17, and possibly any other processes or methods disclosed herein. It is also to be understood that the method of FIG. 17 is not necessarily carried out solely by the network node 1900. At least some operations of the method can be performed by one or more other entities.

Network node 1900 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1900 may be the processing circuitry 770 shown in FIG. 7. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1910, preparing unit 1920, sending unit 1930, and any other suitable units of the network node 1900 to perform corresponding functions according one or more embodiments of the present disclosure, such as a transmitter, a receiver, or a processor.

As illustrated in FIG. 19, the network node 1900 includes cause receiving unit 1910, preparing unit 1920, and sending unit 1930. In some embodiments, the network node 1900 may be a target node. The receiving unit 1910 may be configured to receive an identification from a source node. In some embodiments, the identification may indicate that the network node 1900 is inter-RAT and intra-system to the source node.

The preparing unit 1920 may be configured to prepare a reconfiguration message based on that the network node 1900 is inter-RAT and intra-system to the source node. In some embodiments, the preparing unit 1920 may prepare the reconfiguration message based on characteristics of the target node. In some embodiments, the reconfiguration message may comprise a configuration for reconfiguring lower layer(s) at a user equipment. In some embodiments, the reconfiguration message may further indicate keeping protocol state and configuration for upper layer(s). For example, the preparing unit 1920 may prepare a reconfiguration message to further indicate the UE to maintain the protocol state and the configuration for the upper layer(s). In some embodiments, the reconfiguration message may be prepared by the network node 1900 based on the type of handover. In one embodiment, the source node may be LTE connected to 5GC and the target node may be NR. In another embodiment, the source node may be NR and the target node may be LTE connected to 5GC. In some embodiments, when the target node is NR, the reconfiguration message may comprise RRCReconfiguration containing NR parameters. In some embodiments, when the target node is LTE connected 5GC, the reconfiguration message may comprise RRCConnectionReconfiguration containing LTE parameters. In some embodiments, the reconfiguration message may comprise an intra system security container used to configure security configuration. In some embodiments, the configuration for reconfiguring lower layer may comprise a configuration for at least one of RLC, MAC, and PHY. In some embodiments, the upper layer may comprise SDAP and/or PDCP. In some embodiments, the reconfiguration message may further comprise configurations for an upper layer, wherein the configurations for the upper layer is for maintaining a portion of configurations and modifying a remaining portion of configurations.

The sending unit 1930 may be configured to send the reconfiguration message to the source node for forwarding the reconfiguration message to a UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

According to various embodiments, an advantage of features herein solves the problem of unnecessary reconfigurations when performing inter-RAT handover. Particular embodiments may determine what type of handover is triggered in a UE and then prepare a reconfiguration message including proper reconfigurations which is prepared based on the type of the handover. When particular embodiments perform an intra-system, inter-RAT handover, particular embodiments execute a target node to prepare a corresponding RRC reconfiguration message, and further trigger a UE to only reset the lower RAT specific layers but keep the configuration and state of the upper layer, in which the UE behaves differently compared to traditional inter-RAT handover. Particular embodiments avoid unnecessary reconfigurations and lessen potential operations in the network. Therefore, particular embodiments improve the efficiency of the network.

Another advantage of features herein is that the alignment is configured using the same information for configuring security layers to improve the security when performing intra-system handover, including intra-LTE, intra-NR and inter-NR/LTE handover. That is, the same security parameters may be used to configure the security NR RRC and also for LTE connection to 5GC, so that particular embodiments may include enhancement to the security mode command.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for inter-Radio Access Technology (RAT) handover at a user equipment, comprising:
receiving, from a first network node, a command containing a reconfiguration message and a RAT indicator, wherein the reconfiguration message is based on characteristics of a second network node that are inter-RAT and intra-system to the first network node, and the RAT indicator identifies a RAT of the second network node; and reconfiguring, at a user equipment, a configuration for at least one lower layer and keeping a configuration for at least one upper layer based on the reconfiguration message.

2. The method according to claim 1, wherein the first network node is Long Term Evolution (LTE) connected to 5G Core Network (5GC), and the second network node is New Radio (NR).

3. The method according to claim 1, wherein the first network node is NR, and the second network node is LTE connected to 5GC.

4. The method according to claim 1, wherein the reconfiguration message comprises an intra system security container used to configure security configuration.

5. The method according to claim 1, wherein keeping the configuration for the at least one upper layer comprises maintaining protocol state and configuration for at least one of Service Data Adaptation Protocol (SDAP) and Packet Data Convergence Protocol (PDCP).

6. The method according to claim 1, wherein the first network node is LTE connected to 5GC, and the command is MobilityFromEUTRACommand.

7. The method according to claim 1, wherein the first network node is NR, and the command is MobilityFromNRCommand.

8. The method according to claim 1, wherein keeping the configuration for the at least one upper layer comprises maintaining a portion of configurations and modifying a remaining portion of configurations.

9. A method for inter-Radio Access Technology (RAT) handover at a network node, comprising:
preparing, at a first network node, a reconfiguration message based on characteristics of the first network node that are inter-RAT and intra-system to a second network node, wherein the reconfiguration message comprises a configuration for reconfiguring at least one lower layer configuration at a user equipment while allowing the user equipment to maintain upper layer configurations; and
sending, to the second network node, the reconfiguration message for forwarding the reconfiguration message to the user equipment.

10. The method according to claim 9, wherein the first network node is New Radio (NR), and the second network node is Long Term Evolution (LTE) connected to 5G Core Network (5GC).

11. The method according to claim 9, wherein the first network node is LTE connected to 5GC, and the second network node is NR.

12. The method according to claim 9, wherein the reconfiguration message comprises an intra system security container used to configure security configuration.

13. The method according to claim 9, wherein the reconfiguration message further indicates keeping protocol state and configuration for at least one upper layer.

14. The method according to claim 9, wherein the reconfiguration message further comprises configurations for at least one upper layer, wherein the configurations for the at least one upper layer is for maintaining a portion of configurations and modifying a remaining portion of configurations.

15. A user equipment for inter-Radio Access Technology (RAT) handover comprising:
at least one processing circuitry; and
at least one storage that stores processor-executable instructions, when executed by the processing circuitry, causes a user equipment to:
receive, from a first network node, a command containing a reconfiguration message and a RAT indicator, wherein the reconfiguration message is based on characteristics of a second network node that are inter-RAT and intra-system to the first network node, and the RAT indicator identifies a RAT of the second network node; and
reconfigure a configuration for at least one lower layer and keep a configuration for at least one upper layer based on the reconfiguration message.

16. The user equipment according to claim 15, wherein the first network node is Long Term Evolution (LTE) connected to 5G Core Network (5GC), and the second network node is New Radio (NR).

17. The user equipment according to claim 15, wherein the first network node is NR, and the second network node is LTE connected to 5GC.

18. The user equipment according to claim 15, wherein the reconfiguration message comprises an intra system security container used to configure security configuration.

19. The user equipment according to claim 15, wherein keeping the configuration for the at least one upper layer comprises maintaining protocol state and configuration for at least one of Service Data Adaptation Protocol (SDAP) and Packet Data Convergence Protocol (PDCP).

20. The user equipment according to claim 15, wherein the first network node is LTE connected to 5GC, and the command is MobilityFromEUTRACommand.

21. The user equipment according to claim 15, wherein the first network node is NR, and the command is MobilityFromNRCommand.

22. The user equipment according to claim 15, wherein keeping the configuration for the at least one upper layer comprises maintaining a portion of configurations and modifying a remaining portion of configurations.

23. A network node for inter-Radio Access Technology (RAT) handover comprising:
at least one processing circuitry; and
at least one storage that stores processor-executable instructions, when executed by the processing circuitry, causes a network node to:
prepare a reconfiguration message based on characteristics of the network node that are inter-RAT and intra-system to a second network node, wherein the reconfiguration message comprises configuration for reconfiguring lower layer configurations at a user equipment while allowing the user equipment to maintain upper layer configurations; and
send, to the second network node, the reconfiguration message for forwarding the reconfiguration message to the user equipment.

24. The network node according to claim 23, wherein the network node is New Radio (NR), and the second network node is Long Term Evolution (LTE) connected to 5G Core Network (5GC).

25. The network node according to claim 23, wherein the network node is LTE connected to 5GC, and the second network node is NR.

26. The network node according to claim 23, wherein the reconfiguration message comprises an intra system security container used to configure security configuration.

27. The network node according to claim 23, wherein the reconfiguration message further indicates keeping protocol state and configuration for at least one upper layer.

28. The network node according to claim 23, wherein the reconfiguration message further comprises configurations for at least one upper layer, wherein the configurations for the at least one upper layer is for maintaining a portion of configurations and modifying a remaining portion of configurations.

\* \* \* \* \*